United States Patent
Keohane et al.

(10) Patent No.: US 9,659,305 B2
(45) Date of Patent: *May 23, 2017

(54) CLICK QUALITY CLASSIFICATION AND DELIVERY

(71) Applicant: Cisco Technology, Inc., San Jose, CA (US)

(72) Inventors: Michael F. Keohane, Shrewsbury, MA (US); Maarten Plesman, Wassenaar (NL); Jon Novak, Rutland, MA (US); Adrian C. Smethurst, Groton, MA (US); Vincent Mammoliti, Mississauga (CA)

(73) Assignee: Cisco Technology, Inc., San Jose, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 14/531,212

(22) Filed: Nov. 3, 2014

(65) Prior Publication Data

US 2015/0051971 A1    Feb. 19, 2015

Related U.S. Application Data

(63) Continuation of application No. 14/196,169, filed on Mar. 4, 2014, now Pat. No. 8,917,624, which is a continuation of application No. 12/335,485, filed on Dec. 15, 2008, now Pat. No. 8,670,334.

(60) Provisional application No. 61/058,890, filed on Jun. 4, 2008.

(51) Int. Cl.
*H04L 12/803*     (2013.01)
*G06Q 30/02*      (2012.01)
*H04L 29/06*      (2006.01)

(52) U.S. Cl.
CPC ......... *G06Q 30/0248* (2013.01); *G06Q 30/02* (2013.01); *H04L 47/122* (2013.01); *H04L 63/1416* (2013.01)

(58) Field of Classification Search
CPC ............ H04L 63/1408; H04L 63/1433; H04N 21/8586
See application file for complete search history.

(56) References Cited

U.S. PATENT DOCUMENTS

| 6,625,647 | B1 | 9/2003 | Barrick, Jr. et al. |
| 7,076,479 | B1 * | 7/2006 | Cheung ................ G06Q 30/02 707/735 |
| 7,080,158 | B1 | 7/2006 | Squire |

(Continued)

*Primary Examiner* — David Oveissi (74) *Attorney, Agent, or Firm* — Edell, Shapiro & Finnan, LLC (57) ABSTRACT

In one embodiment, a method includes receiving a packet flow associated with a click-through from an end user node destined for an advertiser server; extracting information from the packet flow; analyzing the extracted information to determine one or more characteristics of the packet flow; and classifying the packet flow based on the determined one or more characteristics; modifying the packet flow to include classification information to provide classification information indicating a quality level of the click-through. The packet flow may include a hypertext transfer protocol GET request. Modifying the packet flow may include adding a tag with classification information that indicates a likelihood of fraudulent click behavior associated with the packet flow.

20 Claims, 7 Drawing Sheets

(56) References Cited

U.S. PATENT DOCUMENTS

| | | |
|---|---|---|
| 2006/0136294 A1 | 6/2006 | Linden et al. |
| 2007/0192190 A1* | 8/2007 | Granville ............... G06Q 30/02 705/14.69 |
| 2008/0004937 A1 | 1/2008 | Chow et al. |
| 2008/0130641 A1* | 6/2008 | Lee ................... H04L 29/12783 370/389 |
| 2008/0168555 A1 | 7/2008 | Oliver et al. |
| 2008/0294711 A1 | 11/2008 | Barber |
| 2008/0306816 A1 | 12/2008 | Matthys et al. |
| 2009/0106413 A1 | 4/2009 | Salo et al. |

* cited by examiner

```
GET /click-quality?=001 HTTP/1.1
Host: www.google.com
User-Agent: Mozilla/5.0 (Windows; U; Windows NT 5.1; en-US; rv:1.8.1.3) Gecko/20070309 Firefox/2.0.0.3
Accept: text/xml,application/xml,application/xhtml+xml,text/html;q=0.9,text/plain;q=0.8,image/png,*/*;q=0.5
Accept-Language: en-us,en;q=0.5
Accept-Encoding: gzip,deflate
Accept-Charset: ISO-8859-1,utf-8;q=0.7,*;q=0.7
Keep-Alive: 300
Connection: keep-alive
Cookie: adsenseReferralSubId=; adsenseReferralClickId=; adwords_api_devguide_version=8; adsenseReferralSourceId=; WebmastersLocale=en; PREF=ID=4fc17e06e00ffa5: TM=1171552354:LM=1171552354:S=TXzLcaIZ0kRpPs6k; SID=DQAAAHYAAADN7grqJaTOKfMRS52a 6BeQhy87cnhoh38c2sl8MvrdAgKkiSgg4_bQsN26Ngab56NB L7Rv1E5gBSUX7UEhTmcnGkj2wUzFC7wyZIIPUY8MGRtCcsCcSWl6spQksAuqY4osS99grGzjfyzdbIWV y Rq5iriTJQ97KLc3Lv83ewTnaA
```

FIG. 6

```
GET /click-quality?=001 HTTP/1.1
Host: www.google.com
User-Agent: Mozilla/5.0 (Windows; U; Windows NT 5.1; en-US; rv:1.8.1.3) Gecko/20070309 Firefox/2.0.0.3
Accept:text/xml,application/xml,application/xhtml+xml,text/html;q=0.9,text/plain ;q=0.8,image/png,*/*;q=0.5
Accept-Language: en-us,en;q=0.5
Accept-Encoding: gzip,deflate
Accept-Charset: ISO-8859-1,utf-8;q=0.7,*;q=0.7
Keep-Alive: 300
Connection: keep-alive
Cookie: adsenseReferralSubId=; adsenseReferralClickId=; adwords_api_devguide_ver sion=8;
adsenseReferralSourceId=; WebmastersLocale=en; PREF=ID=4fc17e006e00ffa5:
TM=1171552354:LM=1171552354:S=TXzLcaIZ0kRpPs6k; SID=DQAAAHYAAADN7grqIaTOKfMRS52a
6BeQhy87cnhoh38c2sl8MvrdAgKkiSgg4_bQsN26Ngab56NB
L7RvIE5gBSUX7UEhTmcnGkj2wUzFC7wyZIIPUY8MGRtCcsCcSW16spQksAuqY4osS99grGzjfyzdbIWV y
Rq5iriTJQ97KLc3Lv83ewTnaA; click-quality=001
```
720

FIG. 7

CLICK QUALITY CLASSIFICATION AND DELIVERY

CROSS-REFERENCE TO RELATED APPLICATIONS

This application is a continuation of U.S. Non-Provisional application Ser. No. 14/196,169 (filed on Mar. 4, 2014), which is a continuation of U.S. Non-Provisional application Ser. No. 12/335,485 (filed on Dec. 15, 2008 and issued as U.S. Pat. No. 8,670,334). The latter application in turn claims the benefit of U.S. Provisional Application No. 61/058,890, filed on Jun. 4, 2008. The entire disclosures of the above applications are incorporated herein by reference.

TECHNICAL FIELD

The present disclosure relates generally to handling of click-throughs on the Internet.

BACKGROUND

The delivery of advertisements on the Internet involves several parties: website content publishers, advertisers, advertisement networks, service providers and end users. A publisher provides web pages of content to the end users and space alongside or within the content for advertisements. The publisher may employ an advertisement network, e.g., Google AdSense, to allow advertisers to bid for placement of advertisements in the ad space. Alternatively, the publisher may arrange directly with advertisers to fill the ad space. In either case, the content with advertisements positioned in the ad space is delivered to the end user over a service provider network. If the end user selects an advertisement, the advertiser pays the publisher or the advertising network for the so-called "click-through" or "click" by the end user.

A rampant problem today is so-called "click fraud," whereby fraudulent click-throughs are generated, costing advertisers large amounts of money. In one type of click fraud, an unscrupulous competitor may generate a large number of click-throughs in order to deplete the advertiser's advertising budget. In another type of click fraud, a rogue publisher sets up a website that contains only advertisements, and generates a large number of click-throughs at the website in order to obtain the advertising revenues. According to one estimate, click fraud constitutes as much as 20% of all Internet traffic.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating example embodiments.

DESCRIPTION OF EXAMPLE EMBODIMENTS

Overview

Flows of interest (e.g., HTTP GETs) from end users are redirected at a click server node. The flows are redirected to a click engine that checks the flows against a database of signatures or characteristics indicative of quality based on, for example, likely fraudulent behavior. The click engine may make a determination from the database check whether a particular flow is likely fraudulent. The determination may also include detecting unknown patterns which may indicate suspicious behavior by, for example, the end user, a domain or a network. Based on that determination, the click engine may add classification information to the flow that classifies the flow at differing levels of quality (e.g., high, medium, low) based on the determination from the database check. The modified flow then may be redirected to its originally intended destination. At the edge of the service provider network or at the destination (e.g., an advertiser), the classification information may be examined and an appropriate action taken based on the classification information.

Example Embodiments

Figure 1:
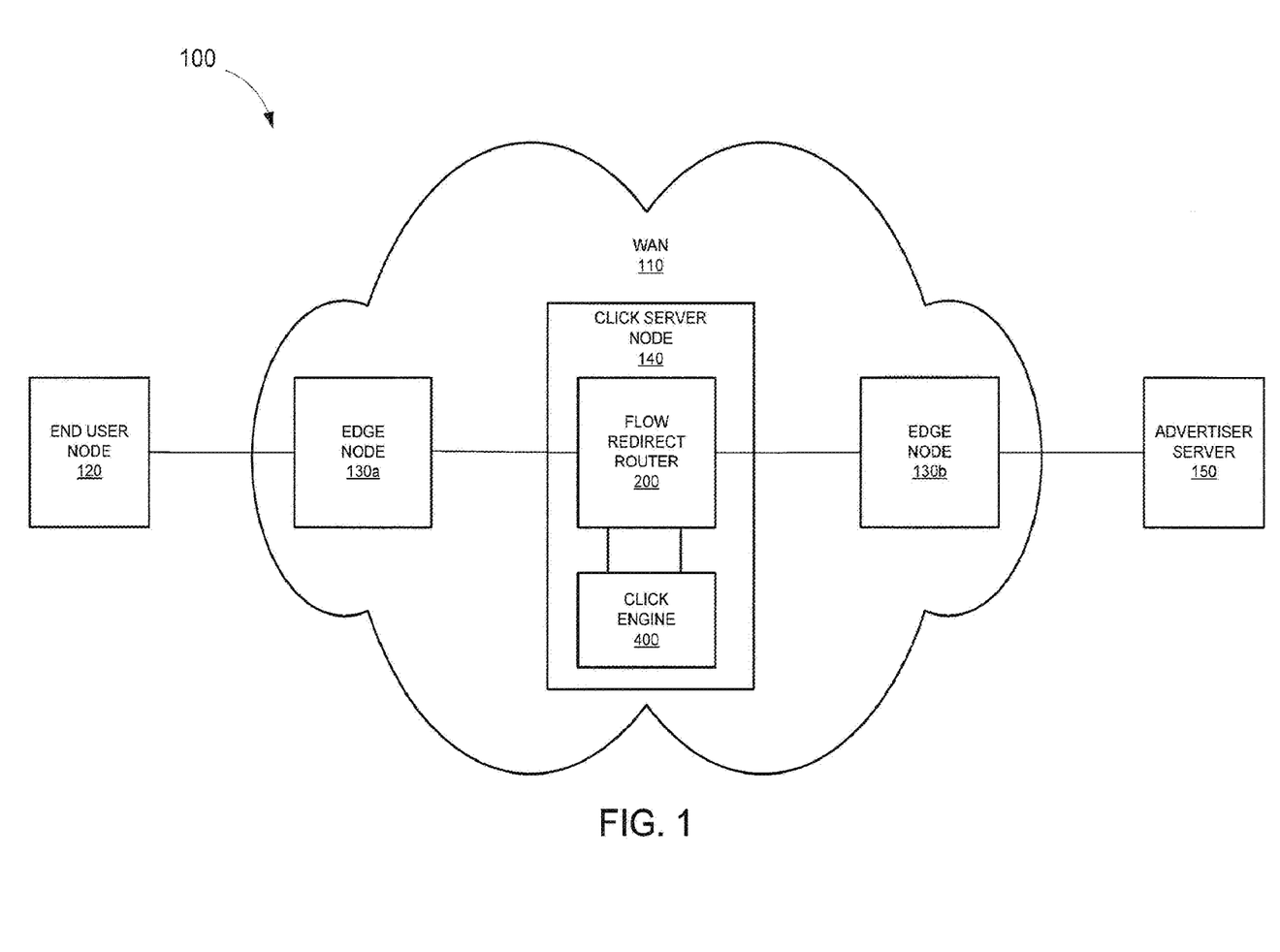
FIG. 1 illustrates an example embodiment of a communications network.

FIG. 1 is a block diagram of an exemplary communications network 100 that may be used with the present disclosure. Network 100 comprises a plurality of nodes including end user node 120, service provider edge nodes 130, click server node 140 and advertiser server node 150 coupled via various data links to form an internetwork of nodes. These internetworked nodes communicate by exchanging data packets according to a pre-defined set of protocols, such as the Transmission Control Protocol/Internet Protocol (TCP/IP) over Asynchronous Transfer Mode (ATM) or Ethernet.

The end user node 120 is a conventional node, such as a personal computer, work station, personal digital assistant (PDA) and the like. The service provider edge nodes 130 are conventional edge nodes, such as a router, configured to interface the end user node 120 with a service provider network which includes the edge nodes 130 and click server node 140 that may be part of a wide area network (WAN) 110. The WAN 110 is a conventional WAN, such as the Internet, comprising various other nodes (not shown) configured to implement the WAN. The advertiser server node 150 is a conventional server node that is configured to exchange information (e.g., data packets) with the end user node 120.

The click server node 140 is illustratively a router node 200 coupled to a click engine 400 that is configured to, inter alia, redirect packet flows received from the network 100 to the click engine 400 for handling analysis of click-throughs and traffic patterns from the end user node 120 contained within the packet flows.

The end user node 120 may be operable to run a browser program to facilitate the access of information on the network. The browser is a hypertext-linked application used for accessing information. Hypertext is a term used to describe a particular organization of information within a data processing system, and its presentation to a user.

Multimedia communications may use the Hypertext Transfer Protocol (HTTP), and files or formatted data may use the Hypertext Markup Language (HTML). These documents and other Internet resources may be accessed across the network by means of a network addressing scheme which uses a locator referred to as a Uniform Resource Locator (URL), for example, "http://www.cisco.com."

Information transfers on the Internet are broken into variable size packets, each of which contains, in addition to its data (payload), control information to be used for its routing and scheduling over the network. In the description herein, the terms below are used in the conventional sense, except where otherwise evident from context, to characterize information transfers on the Internet and, more generally, over packet-based networks.

IP address: A 32 bit label that uniquely identifies a device.
TCP/IP port number: A 16 bit label that uniquely identifies an application within a device.
Packet Labels (Identifiers): Each IP packet is labeled by the following five labels: 1) Source IP address, 2) Source TCP/IP port number, 3) Destination IP address, 4) Destination TCP/IP port number, and 5) Protocol type. These labels are used by TCP/IP for controlling and routing the packet.
IP connection: A source application/destination application pair which exchange data. The connection can be uniquely identified by the five packet labels described above.
IP flow: The packets transmitted over an IP connection.
HTTP: A protocol running over TCP/IP supporting the retrieval of web pages by clients from Web servers.
Cookie: A label that is used by HTTP servers to identify HTTP clients, typically with unique codes (such as user IDs). The HTTP server assigns the label to each client, which the latter uses in further accesses to the server.
Session: A series of requests and responses between a website, server, or other target and a human end-user, typically, over period of a few minutes to a few hours, for purposes of browsing, carrying out a "web transaction" or conducting some other activity.

Figure 2:
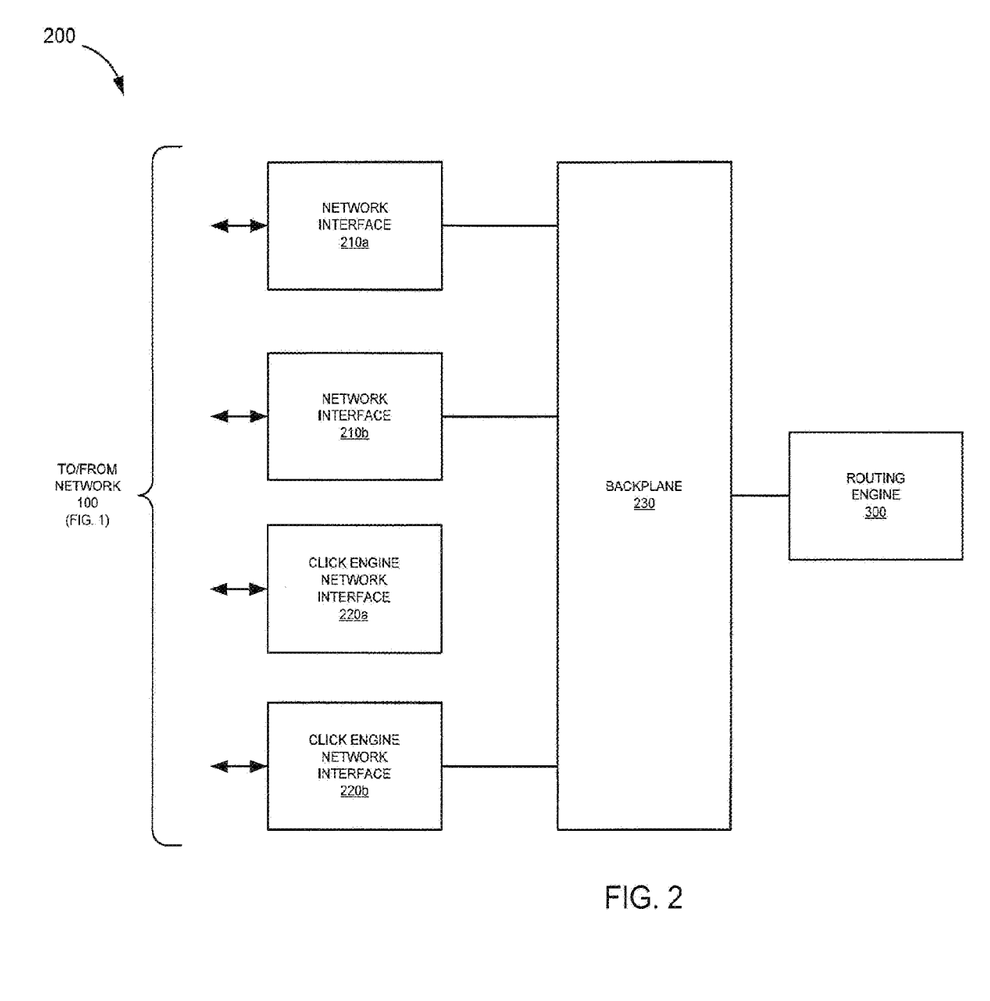
FIG. 2 illustrates an example embodiment of a router node.

FIG. 2 is a high-level block diagram of an example embodiment of a flow redirect router node 200. Router node 200 may comprise one or more network interface cards 210, one or more click center network interface cards 220 and a routing engine card 300 interconnected by a backplane 230. Node 200 is configured to perform various conventional layer-2 (L2) and layer-3 (L3) switching and routing functions. As used herein, L2 and L3 refer to the data-link layer and the network layer, respectively, of the Open Systems Interconnection Reference Model (OSI/RM). Node 200 may also be configured to support various combinations of protocols including, e.g., Open Shortest Path First (OSPF), Intermediate-System-to-Intermediate-System (IS-IS), TCP/IP, RSVP, RTSP, Ethernet, Asynchronous Transfer Mode (ATM) and Frame Relay (FR). An example of a node that may be used is the Cisco 7600 Series Router available from Cisco Systems, Inc.

The backplane 230 comprises point-to-point interconnections that interconnect the various cards and allow data and signals to be transferred between the cards. Network interfaces 210 couple the router node 200 with other nodes in the network 100, e.g., edge nodes 130, and allow data packets to be transferred between node 200 and these nodes using various protocols such as ATM, Frame Relay (FR), Ethernet and the like. To that end, network interface cards 210 comprise conventional interface circuitry that incorporates signal, electrical characteristics and interchange circuits, needed to interface with the physical media of the network 100 and the protocols running over that media. Functionally, the line cards 310 acquire information from the network 100 via ports and forward the information to the backplane as well as transfer information acquired from the backplane to the network via the ports. The ports may be conventional ports such as, e.g., ATM, Ethernet and FR ports. The click engine network interfaces 220 are conventional network interfaces that couple the node 200 with the click engine 400 and enable data to be transferred between the node 200 and the click engine 400.

Figure 3:
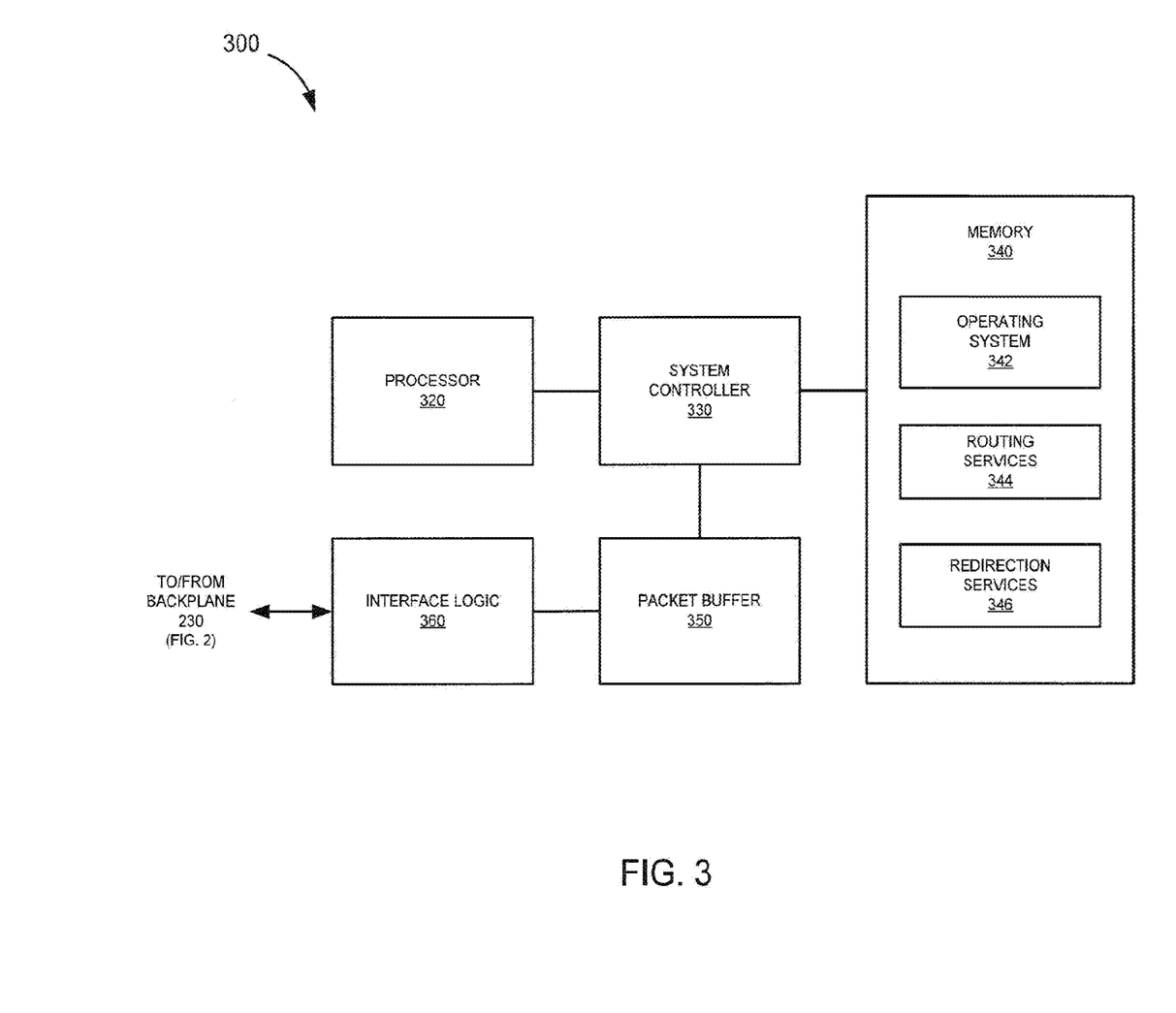
FIG. 3 illustrates an example embodiment of a routing engine.

The routing engine 300 comprises logic that is configured to manage node 200, execute various protocols and perform other functions including forwarding and routing various packets processed by node 200. FIG. 3 is a high-level block diagram of an example embodiment of a routing engine 300. Routing engine 300 comprises interface logic 360, packet buffer 350, system controller 330, processing circuitry and memory 340.

Interface logic 360 is coupled to the backplane 230 and is configured to transfer information (e.g., data) between the backplane 230 and the routing engine 300. Packet buffer 350 is a RAM comprising high-speed RAM devices (e.g., static RAM devices) capable of storing information acquired by the interface logic 360 and processed by processor 320. System controller 330 is coupled to the processor 320, memory 340 and packet buffer 350 and comprises circuitry configured to enable the processor 320 to access (e.g., read, write) memory locations contained in the memory 340 and the packet buffer 350. The processing circuitry illustratively comprises processor 320 which is a conventional CPU configured to execute instructions and manipulate data contained in memory 340 for performing various functions associated with processing packets as described herein. The memory is a computer-readable medium comprising RAM devices, such as DRAM devices, and contains various software and data structures used by processor 320 including operating system 342, routing services 344 and redirection services 346.

Operating system 342 comprises computer-executable instructions and data configured to implement a conventional operating system. The OS 342 is a conventional operating system that comprises computer-executable instructions and data configured to support the execution of processes, such as routing services 344 and redirection services 346, on processor 320. Specifically, OS 342 is configured to perform various conventional operating system functions that, e.g., enable the processes to be scheduled for execution on the processor 320 as well as provide controlled access to various resources of the routing engine 300, such as memory 340.

Routing services 344 is a software process comprising computer-executable instructions and data configured to implement various routing protocols, such as OSPF, and IS-IS. These protocols are configured to manage a forwarding database (FDB) (not shown) containing, e.g., data used to make forwarding decisions for packets processed by the node 200. Redirection services 346 is a software process configured to implement redirection or filtering of packet flows using, e.g., access control lists, policy based routing or the like.

Figure 4:
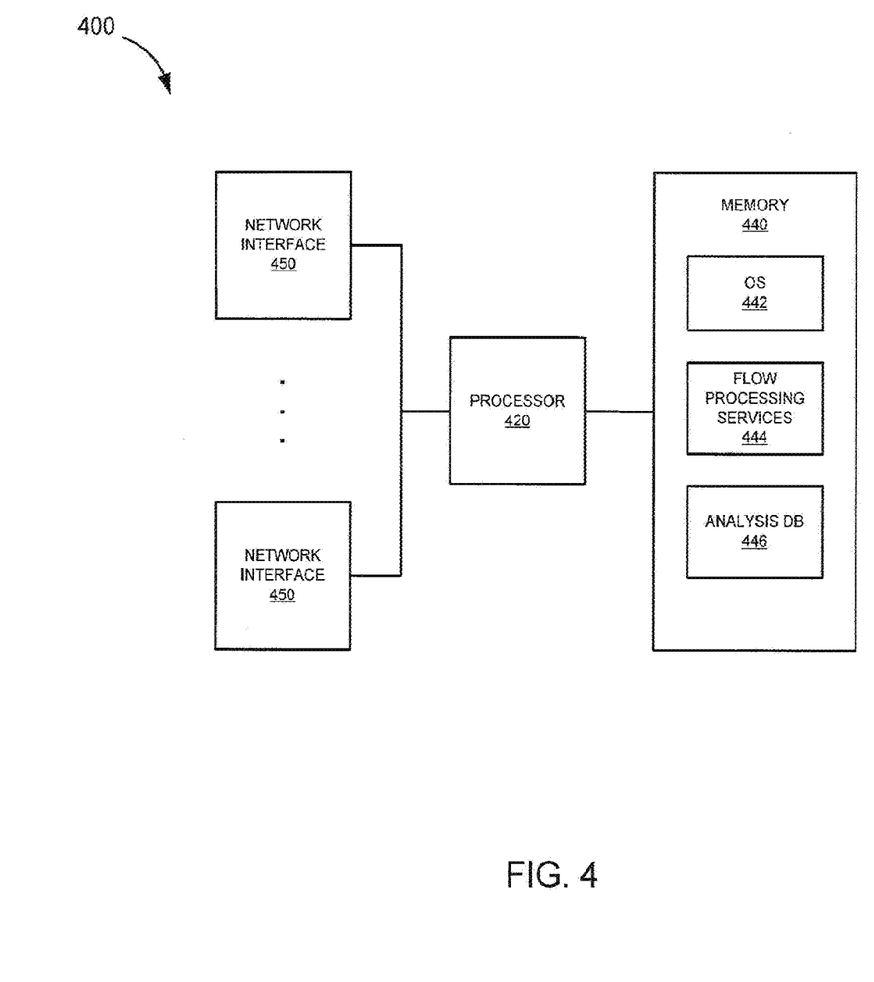
FIG. 4 illustrates an example embodiment of a click engine.

FIG. 4 is a block diagram of an example embodiment of a click engine 400. Click engine 400 comprises processing circuitry, one or more network interfaces 450 and a memory

440. An example of a click engine that may be used is the Cisco System Control Engine (SCE) 2000 available from Cisco Systems, Inc.

The network interfaces 450 are conventional network interfaces that connect (interface) the click engine 400 with the network 100 using various protocols, such as Ethernet. To that end, the network interfaces 450 comprise conventional interface circuitry that incorporates signal, electrical, and mechanical characteristics and interchange circuits needed to interface with the physical media of the network 100 and protocols running over that media.

The processing circuitry illustratively comprises processor 420 which is a conventional central processing unit (CPU) configured to execute instructions and manipulate data contained in the memory 440. The memory 440 is a conventional random access memory (RAM) comprising, e.g., dynamic RAM (DRAM) devices. Memory 440 contains an operating system (OS) 442, flow processing services 444 and analysis database 446. The OS 442 is a conventional operating system that comprises computer-executable instructions and data configured to support the execution of processes, such as flow processing services 444, on processor 420. Specifically, operating system 440 is configured to perform various conventional operating system functions that, e.g., enable processes to be scheduled for execution on the processor 420 as well as provide controlled access to various resources of the click engine 400, such as memory 440 and the network interfaces 450. Flow processing services 444 is a software process comprising computer-executable instructions and data configured, as will be described further below, to handle processing of packet flows such as HTTP flows that may contain click-throughs. The analysis database 446 is a database that may include signatures or characteristics indicative of quality based on, for example, likely fraudulent behavior.

In another embodiment, the click engine 400 may be implemented based on an intrusion detection service module, e.g., Intrusion Detection System Services Module (IDSM-2) available from Cisco Systems, Inc., integrated within router 200. It should be understood that the click server node 140 can be implemented at any node in the service provider network, including the edge nodes 130.

By scanning end user packet flows, e.g., HTTP traffic streams, it is believed that additional revenue can be generated for a service provider by utilizing the information gathered. Based on user traffic characterization, a user quality value can be assigned to an end user. Once a value attribute exists for an end user, features based on that information can be offered to the advertising community. Several models can be deployed to implement differing degrees of end user interaction analysis.

A model referred to as "immediate profile analysis model" uses real-time HTTP scanning. In this model, HTTP streams may be monitored inline, incrementing simple end user or event counters when "signature rules" are alerted. Based on counters, action can be taken to modify the payload, mark the transport layer or document activity.

Another model referred to as "transactional profile analysis model" features local profile generation. In this model, the HTTP stream is channel scanned to a local resource that may be "in-system" for local analysis. The local analysis may be based on data acquired over a longer period of time, possibly several transactions. Based on this analysis, new or revised "signature rules" can be programmed thus enhancing real-time HTTP scanning of a specific end user.

A model called "extended profile analysis model" features extend profile generation whereby the HTTP stream is channel scanned to a heuristic engine for in-depth analysis. The heuristic engine is considered pluggable, meaning several heuristic engines can be deployed to offer specific services. An application programming interface (API) may be used to program the real-time HTTP scanning, thus allowing for analysis of data derived over an extended period of time.

Figure 5:
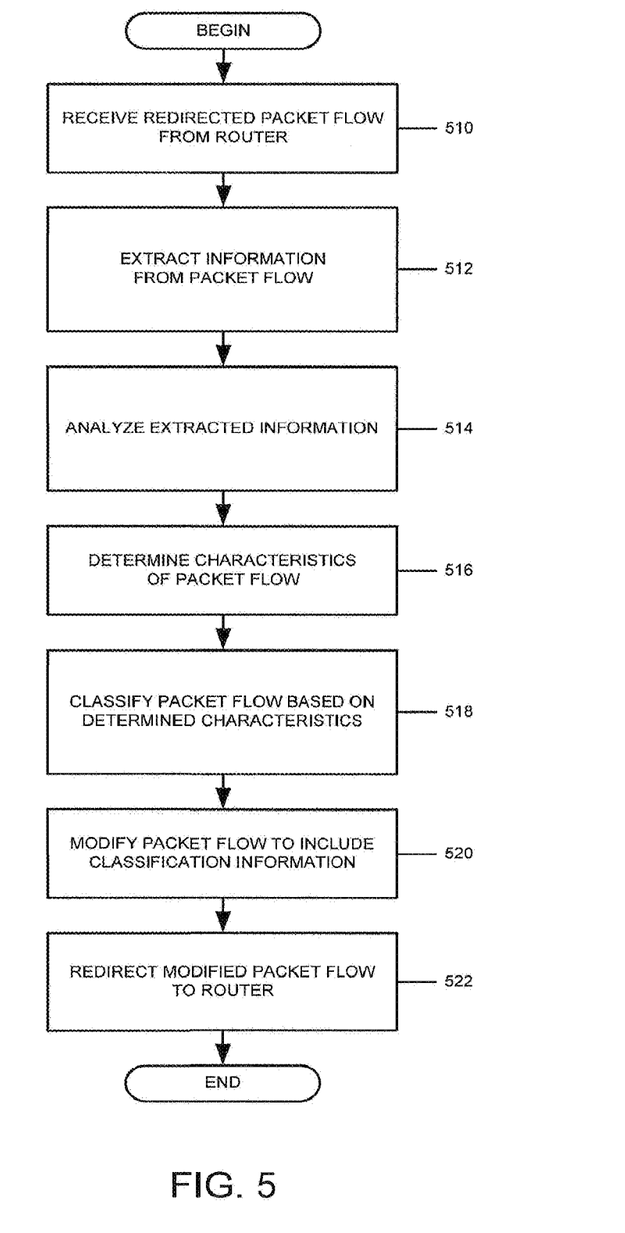
FIG. 5 illustrates an example process for handling redirected packet flows.

FIG. 5 illustrates an example process that may used to configure click engine 400 to handle redirected packet flows received by the click engine from the flow redirection router 200. The process begins at step 510 where the click engine 400 receives the redirected packet flow from router 200. Next the click engine processes the redirected packet flow to extract information at step 512. At step 514 the extracted information is analyzed. The type of analysis may be based on any of the analysis models described above or other analysis models. For example, in the case of immediate profile analysis model, it may be of interest to analyze a GET request in an HTTP flow. With the transactional profile analysis model or extended profile analysis model, the analysis may look for various traffic patterns (e.g., fraud, demographics, etc.) From the analysis of the extracted information, the click engine 400 may determine characteristics of the packet flow at step 516. For example, what type of HTTP transactions are occurring or how much redirection of the HTTP flow is occurring.

Next the click engine 400 may classify the packet flow based on the determined characteristics at step 518. The classification may relate to a type of action to be taken downstream. For example, a flow classified as having low quality may be handled (at the advertiser server 150 or within the service provider network itself) differently than a flow having a high quality classification.

At step 520 the click engine 400 modifies the packet flow to include classification information. The modification may be in the form of adding a "tag" to the packet flow. This tagging may be internal to a data packet (requiring regeneration of cyclic redundancy check (CRC) code and possible HTTP stream manipulation) or external, such as virtual local area network (VLAN) tags, Multi Protocol Label Switching (MPLS) labels or quality of service marking. External tagging allows additional services to be applied, such as providing Optimum Data Path for high-end advertising (e.g., video streams). Generally, the destination (e.g., advertiser server 150) may take appropriate action based on examination of a packet flow that has been modified to include internal tagging. Other nodes, such as edge node 130b, may take appropriate action based on examination of the external tagging of a packet flow.

At step 522, the click engine 400 returns the modified packet flow to the router 200 and the process concludes.

Figure 6:
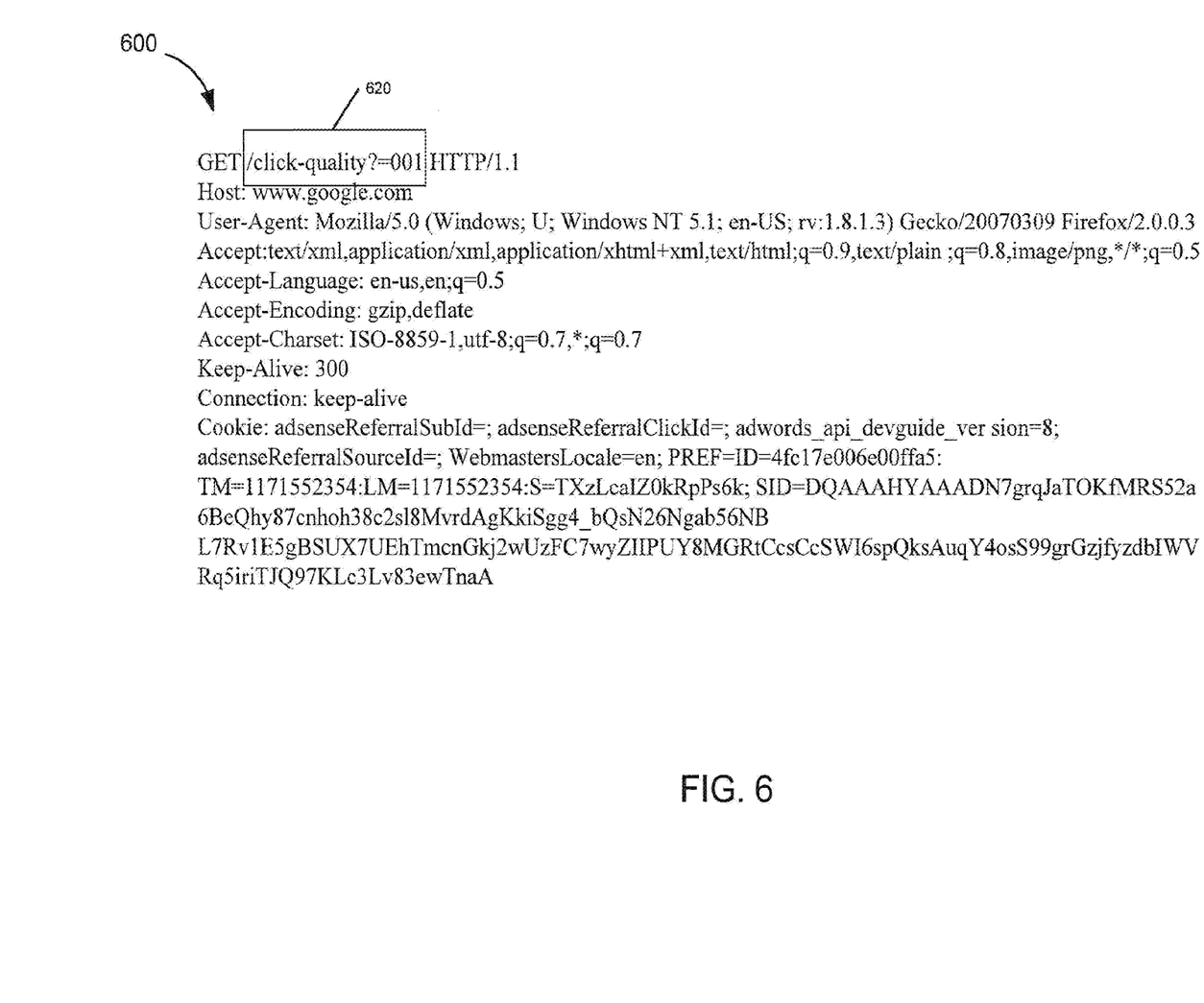
FIG. 6 illustrates a first example of a modified Hypertext Transfer Protocol (HTTP) request.

FIG. 6 illustrates a first example of a modified HTTP request 600. The request shown is a conventional HTTP/1.1 GET request that has been modified to include a variable representation 620. The example variable representation 620 is labeled "click-quality" and has an assigned value of "001" which may be associated with a particular level of quality, e.g., 001=low, 002=medium and 003=high, indicative of likelihood of fraud behavior.

Figure 7:
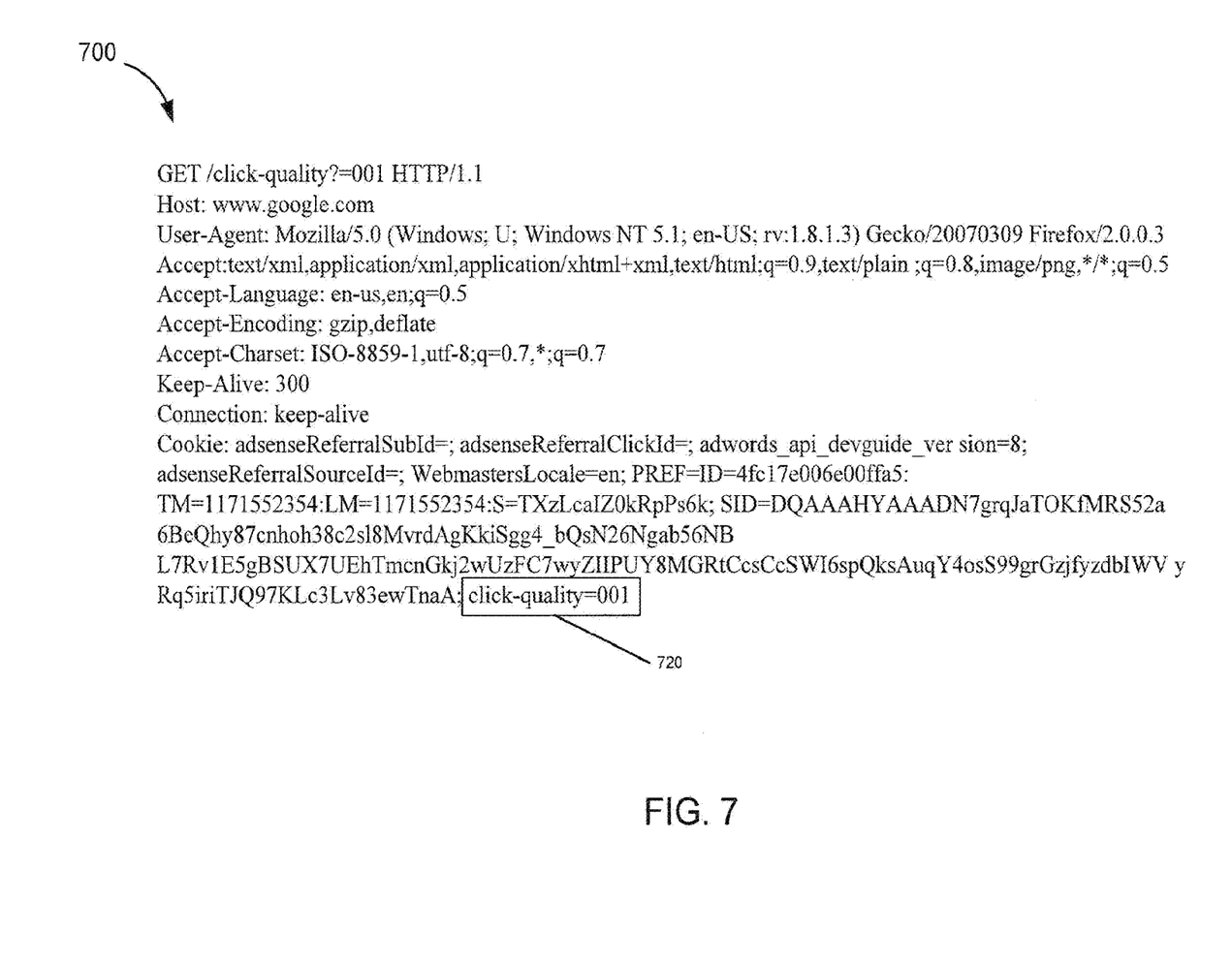
FIG. 7 illustrates a second example of a modified HTTP request.

FIG. 7 illustrates a second example of a modified HTTP request 700. The request shown is again a conventional HTTP/1.1 GET request that has been modified to include an additional cookie field 720. The example additional cookie field 720 is labeled "click-quality" and has an assigned value of "001" which may be associated with a particular level of quality, e.g., 001=low, 002=medium and 003=high, indicative of likelihood of fraud behavior.

The modifications described with respect to FIGS. 6 and 7 are examples of so-called internal modifications. Some embodiments may use either or both of these modifications. A reason for using both may be that certain advertisers only support one option and other advertisers support the other, and it may be easier to make both types of modification without having to track which advertiser is supporting which option.

While the example embodiments have been described in relation to detection of click fraud, it should be understood that other services may be offered based on the configuration described herein. For example, another service may provide counters representing the click rate or number of times a user has clicked a link, thereby giving an indication of intended clicks. Other services include context services (e.g., end user profile/browsing context), location-based services (e.g., identify end user location to the service provider, publisher or advertiser), premium advertisement delivery (e.g., optimal data paths over reserved bandwidth to deliver premium, high bandwidth advertisements), user connectivity profile (e.g., end user device type, end user applications, last mile bandwidth information, last mile latency information), transactional statistics (e.g., comprehensive statistics on end user transactions) and verification services (e.g., verification of delivery, viewing, and conversion of advertisements).

It should be understood that the network, message, flow, and block diagrams may include more or fewer elements, be arranged differently, or be represented differently. It should be understood that implementation may dictate the network, flow, and block diagrams and the number of network, flow, and block diagrams illustrating the execution of example embodiments.

It should be understood that elements of the network, flow, and block diagrams described above may be implemented in software, hardware, or firmware. In addition, the elements of the network and flow diagrams described above may be combined or divided in any manner in software, hardware, or firmware. If implemented in software, the software may be written in any language that can support the embodiments disclosed herein. The software may be stored on any form of computer readable medium, such as random access memory (RAM), read only memory (ROM), compact disk read only memory (CD-ROM), and so forth. In operation, a general purpose or application specific processor may load and execute the software in a manner well understood in the art.

While the foregoing has been particularly shown and described with references to example embodiments thereof, it will be understood by those skilled in the art that various changes in form and details may be made therein without departing from the scope of the invention encompassed by the appended claims.

What is claimed is:

1. A method, comprising:
   extracting information from a redirected packet flow initiated at an end user node and destined for an advertiser server;
   analyzing the extracted information to determine one or more characteristics of the redirected packet flow;
   determining whether the redirected packet flow is associated with a fraudulent click-through;
   based on the determining, creating classification information indicative of whether the redirected packet flow is associated with the fraudulent click-through; and
   adding the classification information to the redirected packet flow, such that the redirected packet flow includes the classification information when received at the advertiser server.

2. The method of claim 1, wherein analyzing the extracted information comprises:
   analyzing the extracted information in accordance with an immediate profile analysis model.

3. The method of claim 1, wherein analyzing the extracted information comprises:
   analyzing the extracted information in accordance with a transactional profile analysis model.

4. The method of claim 1, wherein analyzing the extracted information comprises:
   analyzing the extracted information in accordance with an extended profile analysis model.

5. The method of claim 1, wherein adding classification information to the redirected packet flow comprises:
   adding classification information that classifies the flow as having one of a plurality of predetermined levels of quality.

6. The method of claim 1, wherein adding classification information to the redirected packet flow comprises:
   adding classification information relating to a type of action for performance on the redirected packet flow at the advertiser server.

7. The method of claim 1, wherein adding classification information to the redirected packet flow comprises:
   modifying the redirected packet flow to include a tag with the classification information.

8. The method of claim 7, wherein modifying the redirected packet flow to include a tag comprises:
   modifying the redirected packet flow to include tagging internal to a data packet, such that at least one of cyclic redundancy check (CRC) code regeneration and Hypertext Transfer Protocol (HTTP) stream manipulation is necessitated.

9. The method of claim 7, wherein modifying the redirected packet flow to include a tag comprises:
   modifying the redirected packet flow to include tagging external to a data packet.

10. The method of claim 7, wherein modifying the redirected packet flow to include a tag comprises:
    modifying the redirected packet flow to include at least one of a virtual local area network tag, a multi protocol label switching label, or a quality of service marking.

11. An apparatus comprising:
    a network interface configured to receive a redirected packet flow associated with a click-through initiated at an end user node and destined for an advertiser server;
    a memory storing a database of characteristics indicative of click quality; and
    a processor to:
       extract information from the redirected packet flow;
       analyze the extracted information to determine the one or more characteristics of the redirected packet flow;
       determine whether the redirected packet flow is associated with a fraudulent click-through;
       based on the determination, create classification information indicative of whether the redirected packet flow is associated with the fraudulent click-through; and
       add the classification information to the redirected packet flow, such that the redirected packet flow includes the classification information when received at the advertiser server.

12. The apparatus of claim 11, wherein to analyze the extracted information the processor:
analyzes the extracted information in accordance with an immediate profile analysis model.

13. The apparatus of claim 11, wherein to analyze the extracted information the processor:
analyzes the extracted information in accordance with a transactional profile analysis model.

14. The apparatus of claim 11, wherein to analyze the extracted information the processor:
analyzes the extracted information in accordance with an extended profile analysis model.

15. The apparatus of claim 11, wherein to add classification information to the redirected packet flow the processor:
adds classification information that classifies the flow as having one of a plurality of predetermined levels of quality.

16. The apparatus of claim 11, wherein to add classification information to the redirected packet flow the processor:
adds classification information relating to a type of action for performance on the redirected packet flow at the advertiser server.

17. One or more computer readable non-transitory storage media encoded with software comprising computer executable instructions that when executed by one or more processors, cause the one or more processors to:
extract information from a redirected packet flow associated with a click-through initiated at an end user node and destined for an advertiser server;
analyze the extracted information to determine the one or more characteristics of the redirected packet flow;
determine whether the redirected packet flow is associated with a fraudulent click-through;
based on the determination, create classification information indicative of whether the redirected packet flow is associated with the fraudulent click-through; and
add the classification information to the redirected packet flow, such that the redirected packet flow includes the classification information when received at the advertiser server.

18. The computer readable storage media of claim 17, wherein the instructions that cause the processor to analyze the extracted information comprise instructions that cause the processor to:
analyze the extracted information in accordance with one of
an immediate profile analysis model,
a transactional profile analysis model, and
an extended profile analysis model.

19. The computer readable storage media of claim 17, wherein the instructions that cause the processor to add classification information to the redirected packet flow comprise instructions that cause the processor to:
add classification information to the redirected packet flow that classifies the flow as having one of a plurality of predetermined levels of quality.

20. The computer readable storage media of claim 17, wherein the instructions that cause the processor to add classification information to the redirected packet flow comprise instructions that cause the processor to:
add classification information relating to a type of action for performance on the redirected packet flow at the advertiser server.

* * * * *